(12) United States Patent
Evans et al.

(10) Patent No.: US 8,270,937 B2
(45) Date of Patent: Sep. 18, 2012

(54) LOW-THREAT RESPONSE SERVICE FOR MOBILE DEVICE USERS

(75) Inventors: Gregory M. Evans, Raleigh, NC (US); Alfredo C. Issa, Apex, NC (US)

(73) Assignee: Kota Enterprises, LLC, Wilmington, DE (US)

( * ) Notice: Subject to any disclaimer, the term of this patent is extended or adjusted under 35 U.S.C. 154(b) by 1086 days.

(21) Appl. No.: 11/958,146

(22) Filed: Dec. 17, 2007

(65) Prior Publication Data

US 2009/0156160 A1   Jun. 18, 2009

(51) Int. Cl.
*H04M 11/04* (2006.01)
*H04M 3/00* (2006.01)
*H04M 3/42* (2006.01)
*H04W 24/00* (2009.01)
*G08B 1/08* (2006.01)

(52) U.S. Cl. .............. 455/404.2; 455/404.1; 455/420; 455/414.1; 455/414.2; 455/456.1; 455/456.2; 455/456.3; 455/456.6; 455/457; 340/539.19

(58) Field of Classification Search ........... 455/404.1, 455/404.2, 420, 414.1, 414.2, 456.1–3, 456.6, 455/457; 705/7; 340/539.18, 539.19
See application file for complete search history.

(56) References Cited

U.S. PATENT DOCUMENTS

| | | | |
|---|---|---|---|
| 5,493,692 A | 2/1996 | Theimer et al. |
| 5,754,939 A | 5/1998 | Herz et al. |
| 5,796,727 A | 8/1998 | Harrison et al. |
| 5,903,901 A | 5/1999 | Kawakura et al. |
| 5,949,776 A | 9/1999 | Mahany et al. |
| 6,014,090 A | 1/2000 | Rosen et al. |
| 6,049,711 A | 4/2000 | Ben-Yehezkel et al. |
| 6,240,069 B1 | 5/2001 | Alperovich et al. |
| 6,349,203 B1 | 2/2002 | Asaoka et al. |
| 6,456,234 B1 | 9/2002 | Johnson |
| 6,529,136 B2 | 3/2003 | Cao et al. |
| 6,539,232 B2 | 3/2003 | Hendrey et al. |

(Continued)

FOREIGN PATENT DOCUMENTS

GB   2399928 A   9/2004

(Continued)

OTHER PUBLICATIONS

"Google AdWords: Regional and Local Targeting," https://adwords.google.com/select/targeting.html, copyright 2008 Google, printed Jul. 17, 2008, 1 page.

(Continued)

*Primary Examiner* — Jinsong Hu
*Assistant Examiner* — Opiribo Georgewill
(74) *Attorney, Agent, or Firm* — Withrow & Terranova, PLLC (57) ABSTRACT

A friends-based low-threat response service for subscribers in one or more mobile communications networks is provided. In general, in a low-threat situation, a subscriber initiates a request to the low-threat response service via the subscriber's mobile device. The low-threat response service identifies a friend of the subscriber or a friend-of-a-friend of the subscriber that is geographically proximate to the subscriber as a responder. The low-threat response service then establishes communication between the subscriber and the responder or notifies the subscriber that the responder is coming to provide assistance. The low-threat response service may also effect presentation of information at a mobile device of the responder directing the responder to the subscriber, information at the mobile device of the subscriber directing the subscriber to the responder, or both.

19 Claims, 7 Drawing Sheets

U.S. PATENT DOCUMENTS

| | | | |
|---|---|---|---|
| 6,542,750 B2 | 4/2003 | Hendrey et al. | |
| 6,618,593 B1 | 9/2003 | Drutman et al. | |
| 6,675,015 B1 | 1/2004 | Martini et al. | |
| 6,675,268 B1 | 1/2004 | DeKoning et al. | |
| 6,853,841 B1 | 2/2005 | St. Pierre | |
| 6,876,642 B1 | 4/2005 | Adams et al. | |
| 6,937,860 B2 | 8/2005 | Jahn | |
| 6,947,571 B1 | 9/2005 | Rhoads et al. | |
| 6,954,443 B2 | 10/2005 | Forstadius et al. | |
| 6,970,703 B2 | 11/2005 | Fuchs et al. | |
| 6,975,266 B2 | 12/2005 | Abraham et al. | |
| 6,990,497 B2 | 1/2006 | O'Rourke et al. | |
| 7,020,710 B2 | 3/2006 | Weber et al. | |
| 7,035,618 B2 | 4/2006 | Schnurr | |
| 7,035,912 B2 | 4/2006 | Arteaga | |
| 7,047,315 B1 | 5/2006 | Srivastava | |
| 7,085,571 B2 | 8/2006 | Kalhan et al. | |
| 7,134,040 B2 | 11/2006 | Ayres | |
| 7,171,018 B2 | 1/2007 | Rhoads et al. | |
| 7,200,638 B2 | 4/2007 | Lake | |
| 7,203,753 B2 | 4/2007 | Yeager et al. | |
| 7,206,568 B2 | 4/2007 | Sudit | |
| 7,218,611 B2 | 5/2007 | Mimura et al. | |
| 7,240,106 B2 | 7/2007 | Cochran et al. | |
| 7,249,367 B2 | 7/2007 | Bove, Jr. et al. | |
| 7,260,638 B2 | 8/2007 | Crosbie | |
| 7,269,854 B2 | 9/2007 | Simmons et al. | |
| 7,272,357 B2 | 9/2007 | Nishiga et al. | |
| 7,319,379 B1 | 1/2008 | Melvin | |
| 7,330,112 B1* | 2/2008 | Emigh et al. | 340/539.13 |
| 7,340,768 B2 | 3/2008 | Rosenberger | |
| 7,343,160 B2 | 3/2008 | Morton | |
| 7,359,894 B1* | 4/2008 | Liebman et al. | 1/1 |
| 7,373,109 B2 | 5/2008 | Pohja et al. | |
| 7,509,131 B2 | 3/2009 | Krumm et al. | |
| 7,512,702 B1 | 3/2009 | Srivastava et al. | |
| 7,516,212 B2 | 4/2009 | Nguyen et al. | |
| 7,620,404 B2 | 11/2009 | Chesnais et al. | |
| 7,668,832 B2 | 2/2010 | Yeh et al. | |
| 7,684,815 B2 | 3/2010 | Counts et al. | |
| 2001/0039659 A1 | 11/2001 | Simmons et al. | |
| 2001/0048449 A1 | 12/2001 | Baker | |
| 2002/0019829 A1 | 2/2002 | Shapiro | |
| 2002/0086659 A1 | 7/2002 | Lauper | |
| 2002/0086676 A1 | 7/2002 | Hendrey et al. | |
| 2003/0022675 A1 | 1/2003 | Mergler | |
| 2003/0050062 A1 | 3/2003 | Chen et al. | |
| 2003/0065721 A1 | 4/2003 | Roskind | |
| 2003/0229549 A1 | 12/2003 | Wolinsky et al. | |
| 2004/0107219 A1 | 6/2004 | Rosenberger | |
| 2004/0148393 A1 | 7/2004 | Breiter et al. | |
| 2004/0160307 A1 | 8/2004 | Saikkonen et al. | |
| 2004/0225519 A1 | 11/2004 | Martin | |
| 2005/0015800 A1 | 1/2005 | Holcomb | |
| 2005/0021369 A1 | 1/2005 | Cohen et al. | |
| 2005/0033780 A1 | 2/2005 | Simelius et al. | |
| 2005/0038876 A1 | 2/2005 | Chaudhuri | |
| 2005/0050027 A1 | 3/2005 | Yeh et al. | |
| 2005/0059379 A1 | 3/2005 | Sovio et al. | |
| 2005/0060350 A1 | 3/2005 | Baum et al. | |
| 2005/0071221 A1 | 3/2005 | Selby | |
| 2005/0160270 A1 | 7/2005 | Goldberg et al. | |
| 2005/0174975 A1 | 8/2005 | Mgrdechian et al. | |
| 2005/0197846 A1 | 9/2005 | Pezaris et al. | |
| 2005/0245233 A1 | 11/2005 | Anderson | |
| 2005/0251453 A1 | 11/2005 | Lu | |
| 2005/0251565 A1 | 11/2005 | Weel | |
| 2005/0251566 A1 | 11/2005 | Weel | |
| 2005/0251576 A1 | 11/2005 | Weel | |
| 2005/0251807 A1 | 11/2005 | Weel | |
| 2005/0272413 A1 | 12/2005 | Bourne | |
| 2006/0085419 A1 | 4/2006 | Rosen | |
| 2006/0085821 A9 | 4/2006 | Simmons et al. | |
| 2006/0123080 A1 | 6/2006 | Baudino et al. | |
| 2006/0149628 A1 | 7/2006 | Chefalas et al. | |
| 2006/0149631 A1 | 7/2006 | Brazell et al. | |
| 2006/0168264 A1 | 7/2006 | Baba et al. | |
| 2006/0218225 A1 | 9/2006 | Hee Voon et al. | |
| 2006/0223518 A1* | 10/2006 | Haney | 455/420 |
| 2006/0229939 A1 | 10/2006 | Bhakta et al. | |
| 2006/0240856 A1 | 10/2006 | Counts et al. | |
| 2006/0287915 A1 | 12/2006 | Boulet et al. | |
| 2007/0121843 A1 | 5/2007 | Atazky et al. | |
| 2007/0136132 A1 | 6/2007 | Weiser et al. | |
| 2007/0168254 A1 | 7/2007 | Steelberg et al. | |
| 2007/0174243 A1 | 7/2007 | Fritz | |
| 2007/0205276 A1 | 9/2007 | Sodan et al. | |
| 2007/0218867 A1 | 9/2007 | Mononen et al. | |
| 2007/0249327 A1 | 10/2007 | Nurmi | |
| 2007/0260508 A1 | 11/2007 | Barry et al. | |
| 2007/0271136 A1 | 11/2007 | Strauss et al. | |
| 2008/0016205 A1 | 1/2008 | Svendsen | |
| 2008/0033809 A1 | 2/2008 | Black et al. | |
| 2008/0097999 A1 | 4/2008 | Horan | |
| 2008/0182591 A1 | 7/2008 | Krikorian | |
| 2008/0243863 A1* | 10/2008 | Kanaan | 707/10 |
| 2008/0288375 A1 | 11/2008 | Uhrig et al. | |
| 2009/0030399 A1 | 1/2009 | Gatzke et al. | |
| 2009/0055229 A1* | 2/2009 | Lidgren et al. | 705/7 |
| 2009/0085724 A1 | 4/2009 | Naressi et al. | |
| 2009/0315670 A1 | 12/2009 | Naressi et al. | |

FOREIGN PATENT DOCUMENTS

| | | |
|---|---|---|
| WO | 99/05877 A1 | 2/1999 |
| WO | 00/04730 A1 | 1/2000 |
| WO | 01/24551 A1 | 4/2001 |
| WO | 02/29506 A2 | 4/2002 |
| WO | 02/062092 A1 | 8/2002 |
| WO | 2006/082566 A1 | 8/2006 |

OTHER PUBLICATIONS

"Technology—Geo Targeting," http://www.invidi.com/pages/itc_technology_05.html, copyright 2007, printed Nov. 18, 2008, 1 page.

"IP Multimedia Subsystem," http://en.wikipedia.org/wiki/IP_Multimedia_Subsystem, printed Jul. 8, 2009, 11 pages.

"Internet Relay Chat—Wikipedia, the free encyclopedia," http://en.wikipedia.org/wiki/IRC, printed Nov. 16, 2007, 11 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Windows Live Messenger—Overview," http://get.live.com/messenger/overview, copyright 2007 Microsoft Corp., printed Nov. 28, 2007, 1 page.

"Bluetooth.com—Learn," http://www.bluetooth.com/Bluetooth/Learn/, copyright 2007 Bluetooth SIG, Inc., printed Oct. 26, 2007, 1 page.

"dodgeball.com :: mobile social software," http://www.dodgeball.com/, copyright 2008 Google Inc., printed Jan. 16, 2008, 1 page.

"eHarmony," http://eharmony.com/, copyright 2000-2008 eHarmony.com, printed Jan. 16, 2008, 1 page.

"flickr," http://www.flickr.com/, copyright 2008 Yahoo! Inc., printed Jan. 16, 2008, 1 page.

"Friendster—Home," http://www.friendster.com/, copyright 2002-2007 Friendster, Inc., printed Jan. 16, 2008, 1 page.

"Google Talk," http://www.google.com/talk/, copyright 2008 Google, printed Jan. 16, 2008, 1 page.

"iChat. Not being there is half the fun," http://www.apple.com/macosx/features/ichat.html, printed Jan. 16, 2008, 1 page.

"icq," http://www.icq.com/, copyright 1998-2008 ICQ) Inc., printed Jan. 16, 2008, 2 pages.

"IEEE 802.11," http://en.wikipedia.org/wiki/IEEE_802.11, printed Oct. 26, 2007, 5 pages.

"Anthem—Overview," http://www.intercastingcorp.com/platform/anthem, copyright 2004-2007 Intercasting Corp., printed Jan. 16, 2008, 2 pages.

"Apple—iPod classic," http://www.apple.com/ipodclassic/, printed Oct. 26, 2007, 1 page.

"Jabber SoftwareFoundation," http://www.jabber.org/, copyright 1999-2005 the Jabber Software Foundation, printed Jan. 16, 2008, 3 pages3

"lavalife Where singles click," http://lavalife.com/, copyright 2006 Lavalife Corp., printed Jan. 16, 2008, 1 page.

"Dating Service—Singles, Personals and Love, Match.com," http://www.match.com/, copyright 2008 Match.com, printed Jan. 16, 2008, 2 pages.

"MySpace," http://www.myspace.com/, copyright 2003-2008 MySpace.com, printed Jan. 16, 2008, 2 pages.

"Mobile community, free sms, mobile dating, text flirting and friends networking—playtxt . . . ," http://web.archive.org/ web/20070225125113m_1/www.playtxt.net/playtxt.do, printed Jan. 16, 2008, 1 page.

"Rabble—Social networking for your phone," http://www.rabble.com/, copyright 2005-2008 Intercasting Corp, printed Jan. 16, 2008, 1 page.

"SmallPlanet: Home," http://web.archive.org/web/20061105030323/http://www.smallplanet.net/, copyright 2005 SmallPlanet.net, printed Jan. 16, 2008, 1 page.

"Yahoo! Messenger," http://messenger.yahoo.com/webmessengerpromo.php, copyright 2007 Yahoo! Inc., printed Oct. 26, 2007, 1 page.

"Yahoo! Personals," http://personals.yahoo.com/us/homepage/splash, copyright 2008 Yahoo! Inc., printed Jan. 16, 2008, 2 pages.

"Zune," http://www.zune.net/en-US/, copyright 2008 Microsoft Corporation, printed Jan. 16, 2008, 1 page.

* cited by examiner

LOW-THREAT RESPONSE SERVICE FOR MOBILE DEVICE USERS

FIELD OF THE INVENTION

The present invention relates to a low-threat response service for mobile device users.

BACKGROUND OF THE INVENTION

There are many situations that a person may encounter that do not rise to a level requiring assistance from an emergency response service, such as E911, but for which some lesser response service is desired. In such a situation, friends or acquaintances may be willing to provide assistance. For example, if a motorist has a flat tire, rather than having the motorist call road-side assistance, a friend of the motorist may be willing to provide assistance. However, an issue remains in that it is often difficult for a person in need of assistance to quickly and efficiently identify and contact nearby friends.

SUMMARY OF THE INVENTION

The present invention relates to a friends-based low-threat response service for subscribers in one or more mobile communications networks. In general, in a low-threat situation, a subscriber initiates a request to the low-threat response service from a mobile device associated with the subscriber. The low-threat response service identifies a friend of the subscriber or a friend-of-a-friend of the subscriber that is geographically proximate to the subscriber as a responder. The low-threat response service then establishes communication between the subscriber and the responder or notifies the subscriber that the responder is coming to provide assistance. The low-threat response service may also effect presentation of information at a mobile device of the responder directing the responder to the subscriber, information at the mobile device of the subscriber directing the subscriber to the responder, or both.

More specifically, in one embodiment, the low-threat response service first attempts to identify a friend of the subscriber that is geographically proximate to the subscriber and available to respond. If a friend is identified and available to respond, the low-threat response service then establishes communication between the subscriber and the friend. The low-threat response service may also effect presentation of information at a mobile device of the friend directing the friend to the subscriber, information at a mobile device of the subscriber directing the subscriber to the friend, or both. If a friend is not geographically proximate to the subscriber and available to respond, the low-threat response service attempts to identify a friend-of-a-friend of the subscriber that is geographically proximate to the subscriber and available to respond. If a friend-of-a-friend is identified and available to respond, communication is established between the subscriber and the friend-of-a-friend or the subscriber is notified that the friend-of-a-friend is coming to provide assistance. The low-threat response service may also effect presentation of information at a mobile device of the friend-of-a-friend directing the friend-of-a friend to the subscriber, information at a mobile device of the subscriber directing the subscriber to the friend-of-a-friend, or both.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
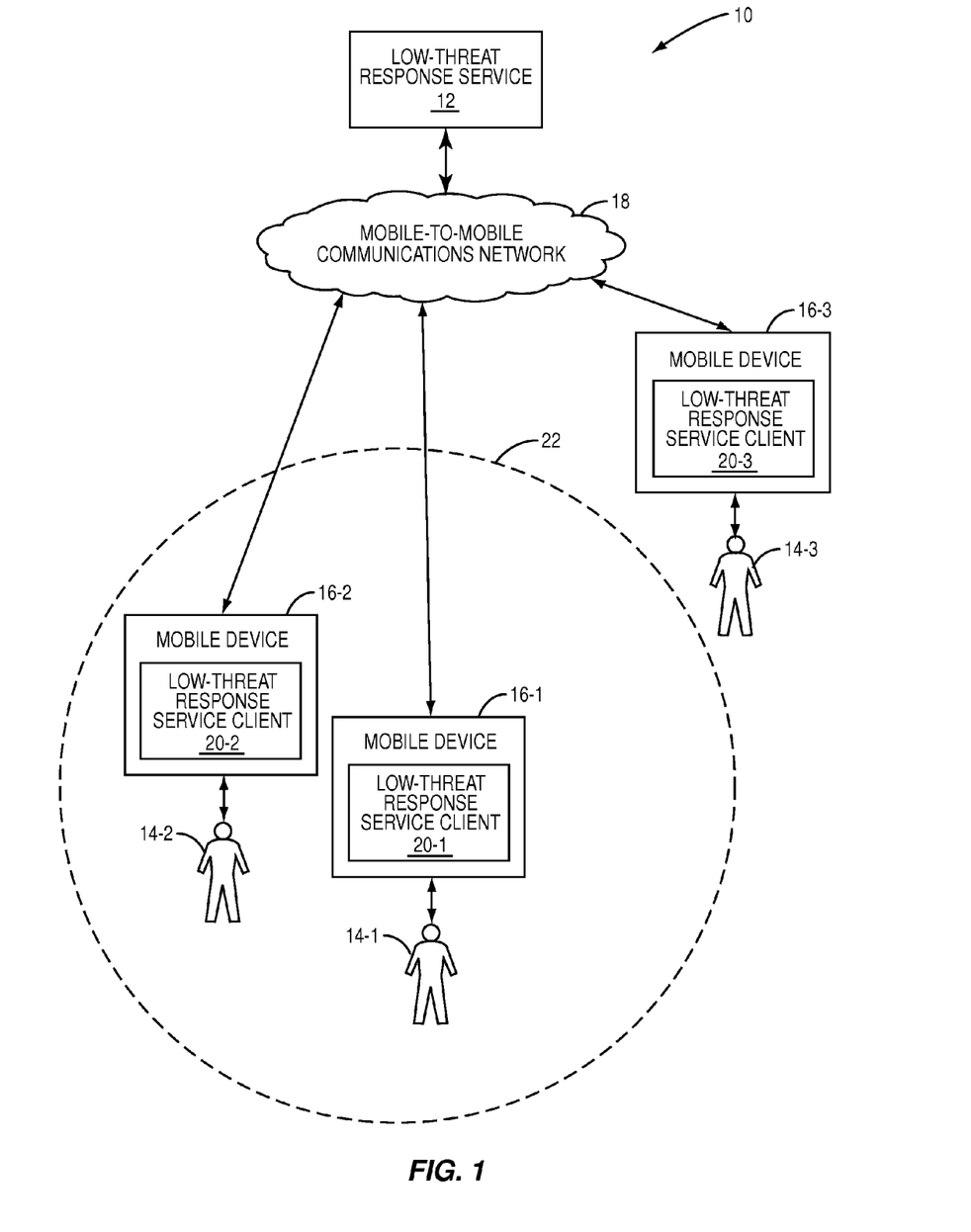
FIG. 1 illustrates a system including a friends-based low-threat response service according to one embodiment of the present invention.

FIG. 1 illustrates a low-threat response system 10 according to one embodiment of the present invention. In general, the low-threat response system 10 includes a low-threat response service 12 available to a number of subscribers 14-1 through 14-3 via associated mobile devices 16-1 through 16-3. The mobile devices 16-1 through 16-3 are capable of communicating with the low-threat response service 12 via a mobile-to-mobile communications network 18. The mobile-to-mobile communications network 18 may be any type or combination of wireless networks such as, for example, 3G Wideband Code Division Multiple Access (W-CDMA) networks, CDMA2000 networks, Time Division Code Division Multiple Access (TD-CDMA) networks, High Speed Downlink Packet Access (HSPDA) networks, WiFi networks, WiMAX networks, or the like. The low-threat response service 12 is preferably a shared service available to multiple wireless carrier networks. Internet Protocol (IP) Multimedia Subsystem (IMS) or similar technology may be used for seamless integration with the multiple wireless networks. Alternatively, the low-threat response service 12 may be implemented for a single wireless network. Note that while only three subscribers 14-1 through 14-3 and three mobile devices 16-1 through 16-3 are illustrated in FIG. 1 for clarity and ease of discussion, the present invention is not limited thereto. The low-threat response system 10 may include any number of subscribers and mobile devices.

The mobile devices 16-1 through 16-3 may be, for example, mobile phones, mobile smart phones such as or similar to an Apple iPhone or BlackBerry®, or the like. The mobile devices 16-1 through 16-3 include low-threat response service clients 20-1 through 20-3, respectively. The low-threat response service clients 20-1 through 20-3 are preferably implemented in software. However, the low-threat response service clients 20-1 through 20-3 may alternatively be implemented in hardware or a combination of software and hardware. In one embodiment, the low-threat response service clients 20-1 through 20-3 are software applications downloaded to the mobile devices 16-1 through 16-3 from, for example, the low-threat response service 12 and installed on the mobile devices 16-1 through 16-3. However, the low-threat response service clients 20-1 through 20-3 may alternatively be pre-installed on the mobile devices 16-1 through 16-3.

In operation, when the subscriber 14-1 is in a low-threat situation, the subscriber 14-1 initiates a request from the low-threat response service client 20-1 to the low-threat response service 12. Since the subscriber 14-1 is making a request, he or she is also referred to herein as a requesting subscriber 14-1. As used herein, a low-threat situation is a situation that does not rise to an emergency level justifying the use of an emergency service such as, for example, E911, road-side assistance, or the like. In response to the request from the low-threat response service client 20-1, the low-threat response service 12 generally operates to identify a friend of the requesting subscriber 14-1 or a friend-of-a-friend of the requesting subscriber 14-1 that is geographically proximate to the requesting subscriber 14-1 and available to respond. The friend or friend-of-a-friend is geographically proximate to the requesting subscriber 14-1 if the friend or friend-of-a-friend is within a proximate area 22 surrounding the subscriber 14-1. The proximate area 22 may be, for example, a circular area having a defined radius. As another example, the proximate area 22 may be an area defined by a maximum response time, where the maximum response time is a maximum time allowed for a responder to be able to get from his or her current location to a location of the requesting subscriber 14-1. Note that the low-threat response service 12 preferably processes the request without human intervention.

In this example, the subscriber 14-3 is listed as a friend of the requesting subscriber 14-1, and the subscriber 14-2 is listed as a friend of the subscriber 14-3. As such, in order to identify a responder that is available to respond to the requesting subscriber 14-1, the low-threat response service 12 first attempts to identify a friend of the requesting subscriber 14-1 that is within the proximate area 22 of the requesting subscriber 14-1. In this example, there are no friends of the requesting subscriber 14-1 within the proximate area 22 of the requesting subscriber 14-1. The low-threat response service 12 then attempts to identify a friend-of-a-friend of the requesting subscriber 14-1 within the proximate area 22 of the requesting subscriber 14-1. In this example, the subscriber 14-2 is a friend of the subscriber 14-3, which is a friend of the requesting subscriber 14-1. As such, the subscriber 14-2 is a friend-of-a-friend of the requesting subscriber 14-1. Thus, the low-threat response service 12 identifies the subscriber 14-2 as a responder for responding to the request of the requesting subscriber 14-1.

As discussed below, the low-threat response service 12 may confirm that the subscriber 14-2 is willing to provide assistance and/or that the requesting subscriber 14-1 is willing to accept assistance from the subscriber 14-2. If so, the low-threat response service 12 effects communication such as, for example, a voice-based communication link, a video or audio-video based communication link, or a text-based communication link between the mobile devices 16-1 and 16-2 of the subscribers 14-1 and 14-2. Alternatively, the low-threat response service 12 may notify the requesting subscriber 14-1 that the responding subscriber 14-2 is coming to provide assistance. In addition or alternatively, the low-threat response service 12 effects presentation of information at the mobile device 16-2 directing the responding subscriber 14-2 to the requesting subscriber 14-1, information at the mobile device 16-1 directing the requesting subscriber 14-1 to the responding subscriber 14-2, or both. This information may be, for example, a map including turn-by-turn directions. The map may be dynamically updated in response to changes in the locations of the requesting and responding subscribers 14-1 and 14-2.

The low-threat response service 12 may be offered as a free service or on a fee basis. For example, a monthly fee may allow a defined number of requests. Any additional requests would incur a per request fee. In addition, the fee may vary depending on various factors, such as whether voice or video communication is to be enabled between the requesting and responding subscribers 14-1 and 14-2. If the networks of multiple wireless carriers are bridged, additional fees may be incurred. In addition, the responding subscriber 14-2 may be subsidized or earn credits via fees collected from the requesting subscriber 14-1.

Note that while the discussion herein focuses on the embodiment where the friends and friends-of-friends of the requesting subscriber 14-1 are also subscribers of the low-threat response service 12, the present invention is not limited thereto. The friends or friends-of-friends may or may not be subscribers to the low-threat response service 12. For example, the friends-of-friends of the requesting subscriber 14-1 may be obtained from a remote social networking service such as a social networking website or the like.

It should also be noted that as used herein, a friend of, for example, the requesting subscriber 14-1 is another user, which may be another one of the subscribers 14-2 through 14-3, that is identified as a friend of the requesting subscriber 14-1. For example, a list of users identified as friends of the requesting subscriber 14-1 may be stored in an associated friends list. Likewise, a friend-of-a-friend of, for example, the requesting subscriber 14-1 is another user, which may be another one of the subscribers 14-2 through 14-3, that is identified as a friend-of-a-friend of the requesting subscriber 14-1, a friend-of-a-friend of a friend of the requesting subscriber 14-1, etc. Thus, as used herein, a friend-of-a-friend may be a first level friend-of-a-friend where there are two degrees of separation between the friend-of-a-friend and the requesting subscriber 14-1, a second level friend-of-a-friend where there are three degrees of separation between the friend-of-a-friend and the requesting subscriber 14-1, etc. There may be any number of two or more degrees of separation between the friend-of-a-friend and the requesting subscriber 14-1. Alternatively, the degrees of separation may be limited by the requesting subscriber 14-1, limited by the low-threat response service 12, or the like.

Figure 2:
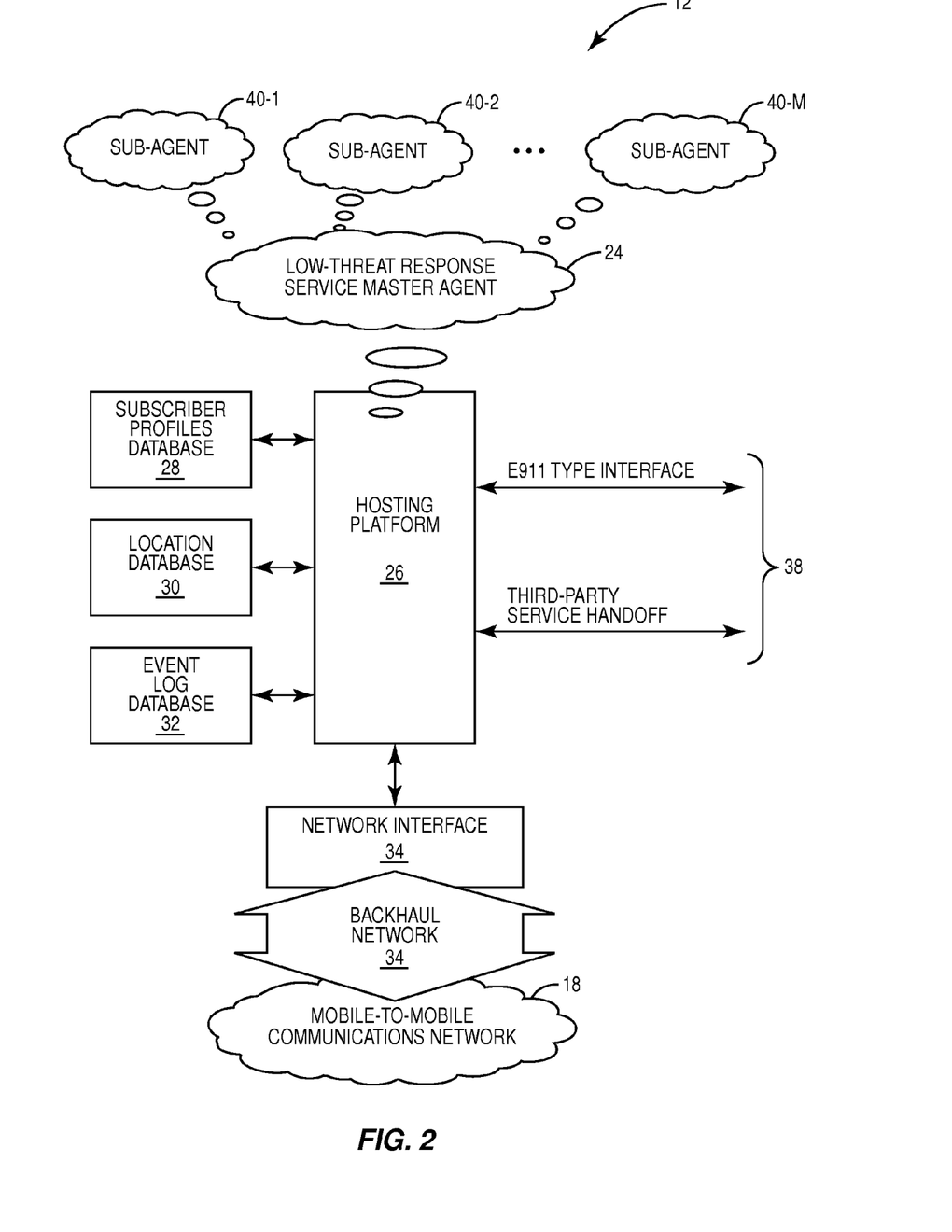
FIG. 2 is a block diagram of a system implementing the low-threat response service of FIG. 1 according to one embodiment of the present invention.

FIG. 2 is a block diagram of an implementation of the low-threat response service 12 according to one embodiment of the present invention. In general, the low-threat response service 12 includes a low-threat response service master agent 24 (hereinafter master agent 24) implemented on a hosting platform 26. The hosting platform 26 may also be referred to herein as a low-threat response service control system. The hosting platform 26 may be implemented as, for example, one or more servers. The hosting platform 26, and thus the master agent 24, has access to a subscriber profiles database 28, a location database 30, and an event log database 32. The hosting platform 26 may be connected to the databases 28 through 32 via a direct connection or via a remote connection such as a Wide Area Network (WAN) connection, a Local Area Network (LAN) connection, or the like. The hosting platform 26, and thus the master agent 24, is also connected to the mobile-to-mobile communications network 18 via a network interface 34 and, in this example, a backhaul network 36. The hosting platform 26, and thus the master agent 24, may also be enabled to communicate with or effect handoff to one or more third party services via corresponding interfaces 38.

The master agent 24 is preferably implemented in software. However, the present invention is not limited thereto. The master agent 24 may alternatively be implemented in hardware or a combination of software and hardware. As discussed below, the master agent 24 operates to obtain subscriber profiles for the subscribers 14-1 through 14-3 of the low-threat response service 12 and store the profiles in the subscriber profiles database 28. For example, the master agent 24 may obtain the subscriber profiles from the subscribers 14-1 through 14-3, from one or more remote social networking services such as one or more social networking websites, or the like. Among other things, each of the subscriber profiles includes a list of friends of the corresponding subscriber or a reference to a list of friends of the corresponding subscriber. In one embodiment, by analyzing the subscriber profiles, the master agent 24 identifies friends-of-friends of each of the subscribers.

The master agent 24 also obtains a current location of each of the subscribers 14-1 through 14-3 from, in this example, the mobile devices 16-1 through 16-3. The mobile devices 16-1 through 16-3 may determine their locations using, for example, a Global Positioning System (GPS) receiver, a local to the device positioning system such as that used in buildings or other structures wherein GPS signals are weak, or the like. Alternatively, the subscribers 14-1 through 14-3 may manually enter their locations at the mobile devices 16-1 through 16-3. The master agent 24 may obtain the locations of the subscribers 14-1 through 14-3 from the mobile devices 16-1 through 16-3 as needed, periodically, or in any other desired manner. Alternatively, the mobile devices 16-1 through 16-3 may report their locations to the master agent 24 periodically, in response to a change in location, in response to a threshold amount of change in location, or the like.

Alternatively, a server or similar control system associated with the mobile-to-mobile communications network 18 or a particular wireless network provider may determine the locations of the mobile devices 16-1 through 16-3 using a technique such as, but not limited to, triangulation. The locations of the mobile devices 16-1 through 16-3 may then be provided to the mobile devices 16-1 through 16-3 or provided directly to the low-threat response service 12.

Lastly, the master agent 24 operates to initiate or otherwise allocate sub-agents 40-1 through 40-M to process low-threat response service requests from the mobile devices 16-1 through 16-3 of the subscribers 14-1 through 14-3. More specifically, in response to receiving a request from, for example, the low-threat response service client 20-1 of the mobile device 16-1 of the subscriber 14-1, the master agent 24 initiates or otherwise allocates one of the sub-agents 40-1 through 40-M to process the request.

The subscriber profiles database 28 stores a subscriber profile for each of the subscribers 14-1 through 14-3. Using the subscriber 14-1 as an example, the subscriber profile of the subscriber 14-1 includes information identifying the subscriber 14-1 and a list of friends of the subscriber 14-1. In addition or as an alternative to the list of friends, the subscriber profile may include a reference to a list of friends of the subscriber 14-1. The reference to the list of friends may be, for example, a reference to a remote social networking service such as a social networking website. The remote social network service may maintain a list of friends of the subscriber 14-1 and, optionally, a list of friends-of-friends of the subscriber 14-1. In addition, the subscriber profile may include information identifying the mobile device 16-1 associated with the subscriber 14-1 that is authorized for use with the low-threat response service 12 and information identifying or defining features or capabilities of the mobile device 16-1. The information identifying the mobile device 16-1 is also referred to herein as a device identifier (ID) and may generally be any information capable of identifying the mobile device 16-1. For example, the information identifying the mobile device 16-1 may be a telephone number of the mobile device 16-1, an IP address of the mobile device 16-1, a Media Access Control (MAC) address of the mobile device 16-1, or the like.

The subscriber profile may also include information related to assistance capabilities of the subscriber 14-1. The assistance capabilities of the subscriber 14-1 may be used by the low-threat response service 12 in order to determine whether the subscriber 14-1 has capabilities desired for responding to a low-threat response service request made by another subscriber. For example, the assistance capabilities may include information identifying the subscriber 14-1 as a healthcare professional such as a doctor, nurse, Emergency Medical Technician (EMT), or the like. As another example, the assistance capabilities may include information identifying the subscriber 14-1 as an automotive repairman, handyman, or the like, thereby identifying the subscriber 14-1 as one who may be capable of assisting another subscriber with car troubles such as, but not limited to, a flat tire. As a final example, the assistance capabilities may identify the subscriber 14-1 as a person that will typically be willing to assist another subscriber with specified types of situations. For example, the subscriber 14-1 may be capable of providing assistance for car trouble but not sickness.

Lastly, the subscriber profile may include a rule set for usage of the low-threat response service 12. For example, the rule set may provide information defining the proximate area 22 of the subscriber 14-1. More specifically, if the proximate area 22 is a circular area, the rule set may include a radius or a maximum response time defining the circular area. The rule set may also include, for example, a list of one or more preferred friends from the friends of the subscriber 14-1 that the subscriber 14-1 prefers to be used by the low-threat response service when responding to requests made by the subscriber 14-1. Similarly, rather than defining a preferred list of friends, the rule set may include priorities assigned to the friends of the subscriber 14-1 to be used by the low-threat response service 12 when selecting a friend or a friend-of-a-friend to respond to requests made by the subscriber 14-1. The rule set may also including information identifying friends, friends-of-friends, or any other subscriber that is not to be selected as a responder for requests made by the subscriber 14-1.

The rule set may also include information limiting the number of levels or degrees of separation to be used for identifying friends-of-friends of the subscriber 14-1. For example, the rule set may state that, for preferred or first priority friends, the maximum degree of separation between the subscriber 14-1 and friends-of-friends is three degrees of separation. In contrast, for lower priority friends, the maximum degree of separation may be two degrees of separation.

The rule set may also include a list of one or more friends to be notified of low-threat response requests made by the subscriber 14-1 even when these friends are not available to respond or within the proximate area 22 of the subscriber 14-1. When a low-threat response request is made by the subscriber 14-1, these friends may be notified and provided updates as the situation develops. For example, these friends may be notified when the request is made, when a responder is identified, when the responder is communicating with and otherwise responding to the subscriber 14-1, and the like. Alternatively, the notification may be delayed until after the low-threat situation has ended.

The rule set may also include one or more default rules for third-party services to be used when there is no friend or friend-of-a-friend within the proximate area 22 of the subscriber 14-1 that is available to respond to a request made by the subscriber 14-1. For example, if the request made by the subscriber 14-1 is related to car trouble, the rule set may state that if there is no friend or friend-of-a-friend within the proximate area 22 that is available to respond, the low-threat response service 12 is to contact or effect communication with an identified towing agency, road-side assistance, or the like. As another example, if the request made by the subscriber 14-1 is a request to escort the subscriber 14-1 when a questionable person is nearby, the rule set may state that if there is no friend or friend-of-a-friend within the proximate area 22 that is available to respond, the low-threat response service 12 is to contact or effect communication with an identified security service or the police.

The location database 30 stores the locations of the mobile devices 16-1 through 16-3 of the subscribers 14-1 through 14-3. In addition, if the subscribers 14-1 through 14-3 have friends or friends-of-friends that are not subscribers, the location database 30 may also store the locations of mobile devices of those friends or friends-of-friends. In one embodiment, the locations are stored in association with the device IDs of the corresponding mobile devices. However, the device IDs may be mapped to subscriber/user IDs.

The event log database 32 is used by the master agent 24 to store an event log for each low-threat response service request made by the subscribers 14-1 through 14-3 via the associated low-threat response service clients 20-1 through 20-3. For a request, the corresponding event log may include information identifying a subscriber from the subscribers 14-1 through 14-3 making the request, information identifying a subscriber from the subscribers 14-1 through 14-3 selected to respond to the request if any, a log of all communication between the requesting subscriber and the responding subscriber if any, a log of the locations of the requesting and responding subscribers, pictures or video captured by the mobile devices of the requesting and responding subscribers, information identifying any third-party service contacted, a log of all communication with any third-party service contacted, or the like.

Figure 3:
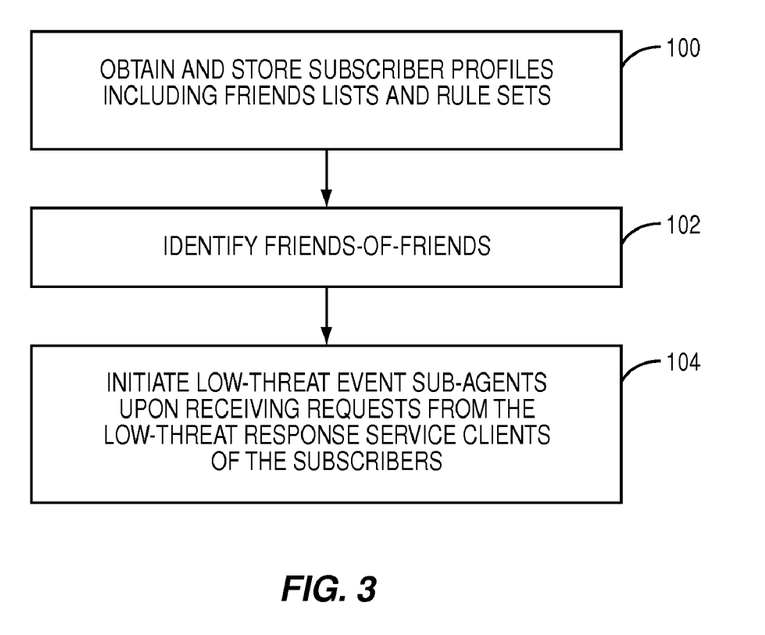
FIG. 3 is a flow chart illustrating the operation of a master agent of the low-threat response service of FIGS. 1 and 2 according to one embodiment of the present invention.
Figure 4A:
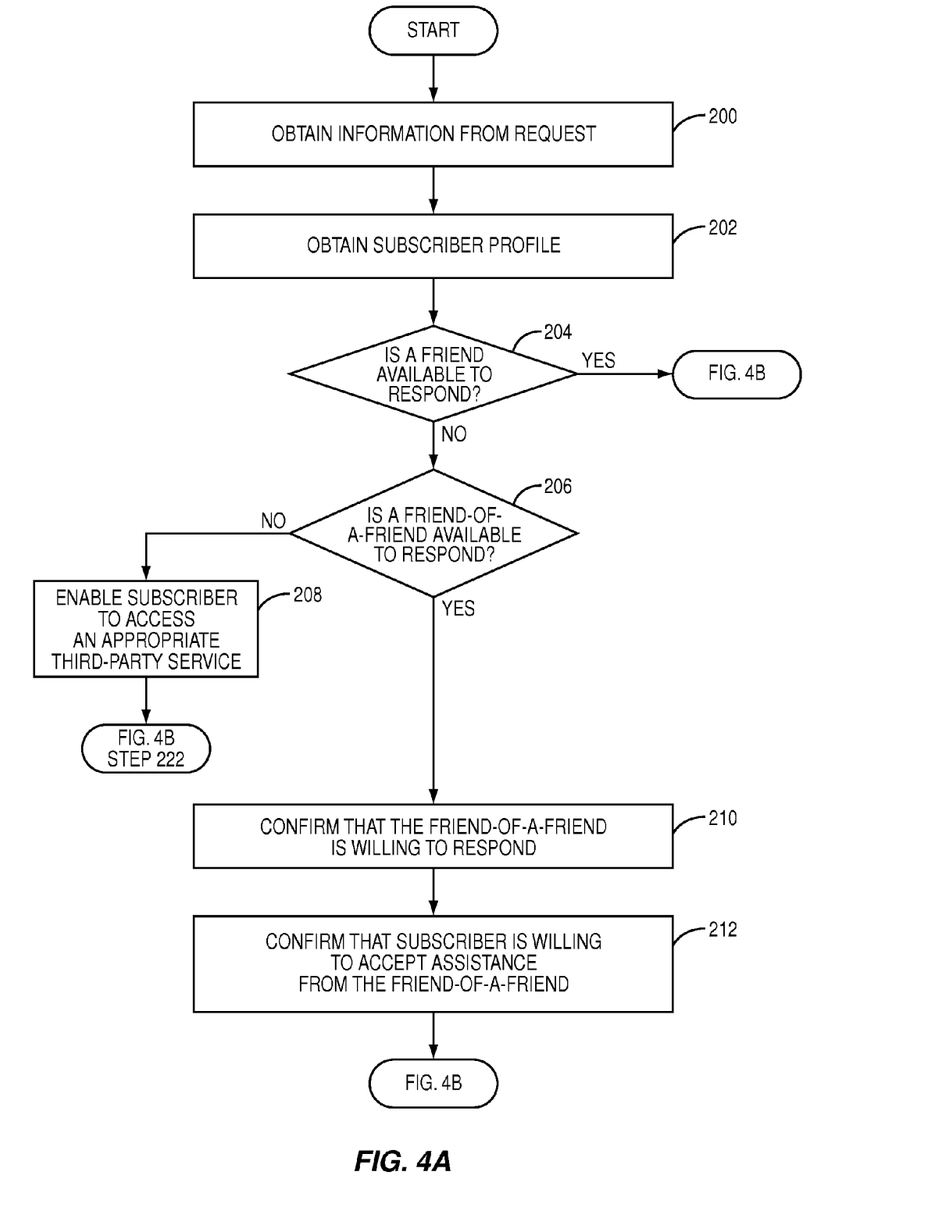
FIGS. 4A and 4B are a flow chart illustrating the operation of a sub-agent of the master agent of the low-threat response service responsible for processing a low-threat response service request according to one embodiment of the present invention.
Figure 4B:
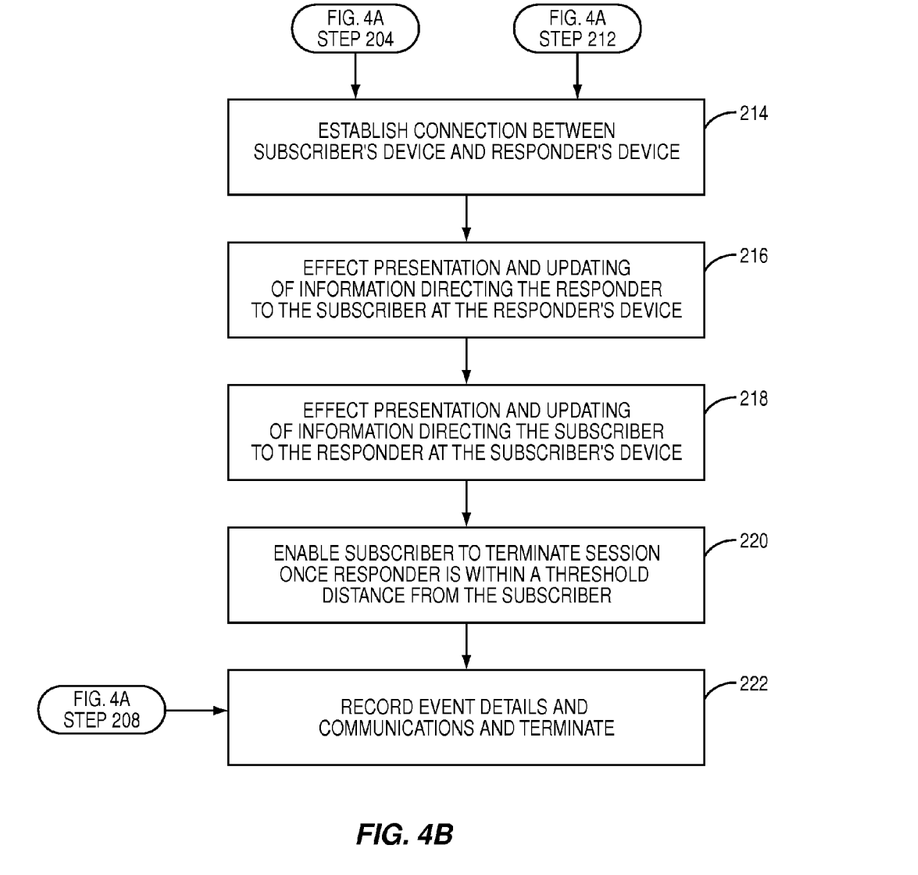

FIGS. 3, 4A, and 4B illustrate the operation of the low-threat response service 12 of FIGS. 1 and 2 according to one embodiment of the present invention. FIG. 3 illustrates the operation of the master agent 24. First, the master agent 24 obtains and stores subscriber profiles for the subscribers 14-1 through 14-3 of the low-threat response service 12 (step 100). As discussed above, the subscriber profile of, for example, the subscriber 14-1 includes a list of friends of the subscriber 14-1 or a reference to a list of friends of the subscriber. The list of friends may be, for example, manually entered or selected by the subscriber 14-1, imported from or otherwise corresponding to a contact list or buddy list of the subscriber 14-1, or the like. In addition or alternatively, the subscriber profile may include a reference to a list of friends of the subscriber 14-1 and optionally a reference to a list of friends-of-friends of the subscriber 14-1, maintained by a remote service such as, for example, a social networking website. In addition, the subscriber profile may include a rule set for the subscriber 14-1.

Next, in this embodiment, the master agent 24 identifies friends-of-friends for each of the subscribers 14-1 through 14-3 by processing the friends lists of the subscribers 14-1 through 14-3 (step 102). For each of the subscribers 14-1 through 14-3, information identifying the friends-of-friends may then be stored in the corresponding subscriber profile. As an example, if the friends list of the subscriber 14-1 lists the subscriber 14-3 as a friend and the friends list of the subscriber 14-3 lists the subscriber 14-2 as a friend, the master agent 24 identifies the subscriber 14-2 as a friend-of-a-friend of the subscriber 14-1 and vice versa. Note that where a subscriber's rule set contains limitations on the degrees of separation, those limitations are considered when identifying the subscriber's friends-of-friends. In addition, a separate friends-of-a-friend list may be provided for each of the subscriber's friends. This may be beneficial where priorities are assigned to the subscriber's friends. Each friend-of-a-friend list may include friends indirectly linked to the subscriber via a particular friend of the subscriber, which is referred to as a base friend. Each friend-of-a-friend list may inherit the priority assigned to the corresponding base friend of the subscriber. Further, the number of degrees of separation for each friend-of-a-friend list may be limited based on the priority of the corresponding base friend of the subscriber.

In addition or alternatively, the master agent 24 may identify friends-of-friends for each of the subscribers 14-1 through 14-3 by querying one or more associated social networking services. For example, if the subscriber 14-1 is a member of a social networking website, the subscriber profile of the subscriber 14-1 may include a reference to the social networking website. The master agent 24 may then query the social networking website to identify the friends of the subscriber 14-1 and the friends-of-friends of the subscriber 14-1. It should be noted that while the master agent 24 identifies the friends-of-friends of each of the subscribers 14-1 through 14-3 in the exemplary embodiment of FIG. 3, the sub-agents 40-1 through 40-M may alternatively identify the friends-of-friends of the subscribers when processing requests from the subscribers 14-1 through 14-3.

In response to receiving requests from the low-threat response service clients 20-1 through 20-3 of the subscribers 14-1 through 14-3, the master agent 24 initiates or otherwise allocates the sub-agents 40-1 through 40-M (step 104). More specifically, upon receiving a request from, for example, the low-threat response service client 20-1, the master agent 24 initiates or otherwise allocates one of the sub-agents 40-1 through 40-M to process the request. Note that steps 100 through 104 may be repeated as needed or desired. Alternatively, the master agent 24 may include a separate process or thread for each of the steps 100 through 104.

FIGS. 4A and 4B illustrate the operation of one of the sub-agents 40-1 through 40-M according to one embodiment of the present invention. The sub-agent 40-1 is used for the following discussion. However, the discussion is equally applicable to the other sub-agents 40-2 through 40-M. First, the sub-agent 40-1 obtains information from the received request (step 200). In one embodiment, the request includes information identifying the requesting subscriber, which in this example is the subscriber 14-1. The subscriber 14-1 making the request is also referred to as the requesting subscriber 14-1. In addition, the request may include a current location of the requesting subscriber 14-1, the device ID of the mobile device 16-1 of the requesting subscriber 14-1, and a type of low-threat situation or event being experienced by the requesting subscriber 14-1. As discussed below, the requesting subscriber 14-1 may selected the type of low-threat situation from a list of potential low-threat situations such as, for example, car trouble, escort needed, sickness or health related question, or the like.

The sub-agent 40-1 then obtains the subscriber profile of the requesting subscriber 14-1 (step 202). Note that in one embodiment, the master agent 24 has identified the friends-of-friends of the subscribers 14-1 through 14-3 and stored one or more friends-of-friends lists in the corresponding subscriber profiles. However, in an alternative embodiment, the sub-agent 40-1 may identify the friends-of-friends of the requesting subscriber 14-1 by, for example, processing the friends lists of the subscribers 14-1 through 14-3 or querying an associated social networking service.

As discussed above, the subscriber profile may include a list of one or more persons to notify regarding low-threat response service requests made by the requesting subscriber 14-1 regardless of whether those persons are within the proximate area 22 of the requesting subscriber 14-1. If the subscriber profile of the requesting subscriber 14-1 includes such a list, the sub-agent 40-1 may notify those persons of the low-threat response service request made by the requesting subscriber 14-1 via an automated phone call, text-message, email, or the like. The notification may be concurrent with processing the request or delayed until processing of the request is complete.

The sub-agent 40-1 then determines whether a friend of the requesting subscriber 14-1 is available to respond (step 204). More specifically, the sub-agent 40-1 queries the location database 30 to determine whether one or more of the friends of the requesting subscriber 14-1 are within the proximate area 22 of the requesting subscriber 14-1. If there is only one friend within the proximate area 22, then that friend is selected as a responder.

If there are multiple friends within the proximate area 22, the sub-agent 40-1 may select one of those friends as a responder. The responder may be selected from the friends within the proximate area 22 as function of the capabilities of the friends as compared to the low-threat event type of the request, priorities assigned to the friends, distance from or response time to the requesting subscriber 14-1, or the like, or any combination thereof. Thus, for example, if the low-threat event type is car trouble, one or more of the friends within the proximate area 22 of the requesting subscriber 14-1 having the capability of providing assistance with car trouble are identified. If there is more than one such friend, then the one having the highest priority and/or being closest to the requesting subscriber 14-1 may be selected as the responder. Note that before selecting a friend as the responder, the sub-agent 14-1 may or may not confirm that the friend is willing to provide assistance, that the requesting subscriber 14-1 is willing to accept assistance from the friend, or both. Whether or not confirmation is desired may be stored as part of the subscriber profile of the requesting subscriber 14-1, the subscriber profile of the responder, or both.

If there is a friend available to respond to the request of the requesting subscriber 14-1, the process proceeds to step 214 (FIG. 4B). If there is no friend that is available to respond to the request of the requesting subscriber 14-1, the sub-agent 40-1 determines whether a friend-of-a-friend is available to respond (step 206). More specifically, the sub-agent 40-1 queries the location database 30 to determine whether one or more friends-of-friends of the requesting subscriber 14-1 are within the proximate area 22 of the requesting subscriber 14-1. If there is only one friend-of-a-friend within the proximate area 22, then that friend-of-a-friend is selected as a potential responder. If there are multiple friends-of-friends within the proximate area 22, the sub-agent 40-1 may select one of those friends-of-friends as a potential responder. The potential responder may be selected from the friends-of-friends within the proximate area 22 as function of the capabilities of the friends-of-friends as compared to the low-threat event type of the request, priorities associated with the friends-of-friends, distance from or response time to the requesting subscriber 14-1, or the like, or any combination thereof.

If there is no friend-of-a-friend available to respond, the sub-agent 40-1 may enable the requesting subscriber 14-1 to access an appropriate third-party service (step 208). As discussed above, the subscriber profile of the requesting subscriber 14-1 may include rules identifying preferred third-party services to be used for one or more low-threat event types. If there is no preferred third-party service defined in the subscriber profile, the sub-agent 40-1 may identify an appropriate third-party service based on the low-threat event type. Note that one or more third-party service may be predetermined by the low-threat response service 12 for each low-threat event type. The sub-agent 40-1 may then establish communication between the mobile device 16-1 of the requesting subscriber 14-1 and the preferred or appropriate third-party service by contacting the third-party service on behalf of the requesting subscriber 14-1 and performing a hand-off of the request to the third-party service. Alternatively, the sub-agent 40-1 may provide contact information, such as a telephone number, for the third-party service to the mobile device 16-1 of the requesting subscriber 14-1. In either case, the sub-agent 40-1 preferably monitors the communication between the third-party service and the requesting subscriber 14-1. The process then proceeds to step 222 (FIG. 4B).

Returning to step 206, if a friend-of-a-friend is available, the sub-agent 40-1 then confirms that the friend-of-a-friend selected as the potential responder is willing to provide assistance (step 210). In the preferred embodiment, the sub-agent 40-1 does not, at this point, reveal the identity of the requesting subscriber 14-1 or the location of the requesting subscriber 14-1 to the potential responder. The sub-agent 40-1 may reveal the type of low-threat event, name of one or more friends linking the potential responder to the requesting subscriber 14-1, a distance to or estimated time to get to the requesting subscriber 14-1, or the like. Confirmation may be obtained by, for example, sending a text message to the mobile device of the potential responder asking if the potential responder is willing to provide assistance, placing an automated telephone call to the potential responder asking if the potential responder is willing to provide assistance, or the like.

In a similar manner, the sub-agent 40-1 confirms that the requesting subscriber 14-1 is willing to accept assistance from the potential responder (step 212). Confirmation may be obtained via the low-threat response service client 20-1, a text-message, an automated voice system, or the like. The identity of the potential responder may or may not be revealed to the requesting subscriber 14-1 at this time. In one embodiment, the sub-agent 40-1 provides information identifying the potential responder to the requesting subscriber 14-1 such as a name of the potential responder or a picture of the potential responder, a list of one or more friends linking the potential responder to the requesting subscriber 14-1, a location of the potential responder, a distance to the potential responder, an estimated time it will take for the potential responder to get to the location of the requesting subscriber 14-1, or the like. In addition or alternatively, the sub-agent 40-1 may enable communication between the requesting subscriber 14-1 and one or more intermediate friends linking the requesting subscriber 14-1 to the potential responder for authentication of the potential responder by the one or more intermediate friends. After confirmation from both the potential responder and the requesting subscriber 14-1 is received, the potential responder is identified as a responder for responding to the requesting subscriber 14-1. If the potential responder is not willing to respond or if the requesting subscriber 14-1 is not willing to accept assistance from the potential responder, the process returns to step 206.

At this point whether a friend or a friend-of-a-friend is selected as the responder, the sub-agent 40-1 establishes communication between the mobile device 16-1 of the requesting subscriber 14-1 and the mobile device of the responder (step 214). For this example, assume that the responder is the subscriber 14-2, which for this discussion is referred to as responding subscriber 14-2. The communication may be provided via a voice-based communication link, a video or audio-video based communication link, or a text-based communication link. Alternatively, the sub-agent 40-1 may notify the requesting subscriber 14-1 that the responding subscriber 14-2 is coming to provide assistance rather than establish communication between the requesting and responding subscribers 14-1 and 14-2. The requesting and responding subscribers 14-1 and 14-2 may establish communication with one another if desired. The sub-agent 40-1 may provide a picture of the responding subscriber 14-2 to the requesting subscriber 14-1 and vice versa.

In this example, the sub-agent 40-1 also effects presentation and updating of information at the mobile device 16-2 of the responding subscriber 14-2 directing the responding subscriber 14-2 to the requesting subscriber 14-1 (step 216). This information may be, for example, a map including directions from the location of the responding subscriber 14-2 to the location of the requesting subscriber 14-1. The map may thereafter be updated as the location of the responding subscriber 14-2 changes, the location of the requesting subscriber 14-1 changes, or both. In a similar manner, the sub-agent 40-1 may also effect presentation and updating of information at the mobile device 16-1 of the requesting subscriber 14-1 directing the requesting subscriber 14-1 to the responding subscriber 14-2 (step 218). Again, this information may be, for example, a map including directions from the location of the requesting subscriber 14-1 to the location of the responding subscriber 14-2. The map may thereafter be updated as the location of the requesting subscriber 14-1 changes, the location of the responding subscriber 14-2 changes, or both.

The sub-agent 40-1 enables the requesting subscriber 14-1 to terminate the session once the responding subscriber 14-2 is within a threshold distance from the requesting subscriber 14-1 (step 220). More specifically, in one embodiment, once the responding subscriber 14-2 reaches the requesting subscriber 14-1, the sub-agent 40-1 sends a request to the low-threat response service client 20-1 to ask the requesting subscriber 14-1 if the session can be terminated. If there is no response, the sub-agent 40-1 may contact an emergency service such as E911. Also note that if the responding subscriber 14-2 does not arrive at the location of the requesting subscriber 14-1 within some time-out period, the requesting subscriber 14-1 may be given the option of activating a third-party service or an emergency service. Again, if the requesting subscriber 14-1 does not respond, the sub-agent 40-1 may contact an emergency service such as E911.

Once processing of the low-threat response service request is complete, the sub-agent 40-1 records event details and communications between the requesting subscriber 14-1, the responding subscriber 14-2, and any emergency or third-party response service in the event log database 32 (step 222). Note that if so desired, the police or similar service may be notified of the event and choose to follow up with the requesting subscriber 14-1 or the responding subscriber 14-2.

Figure 5:
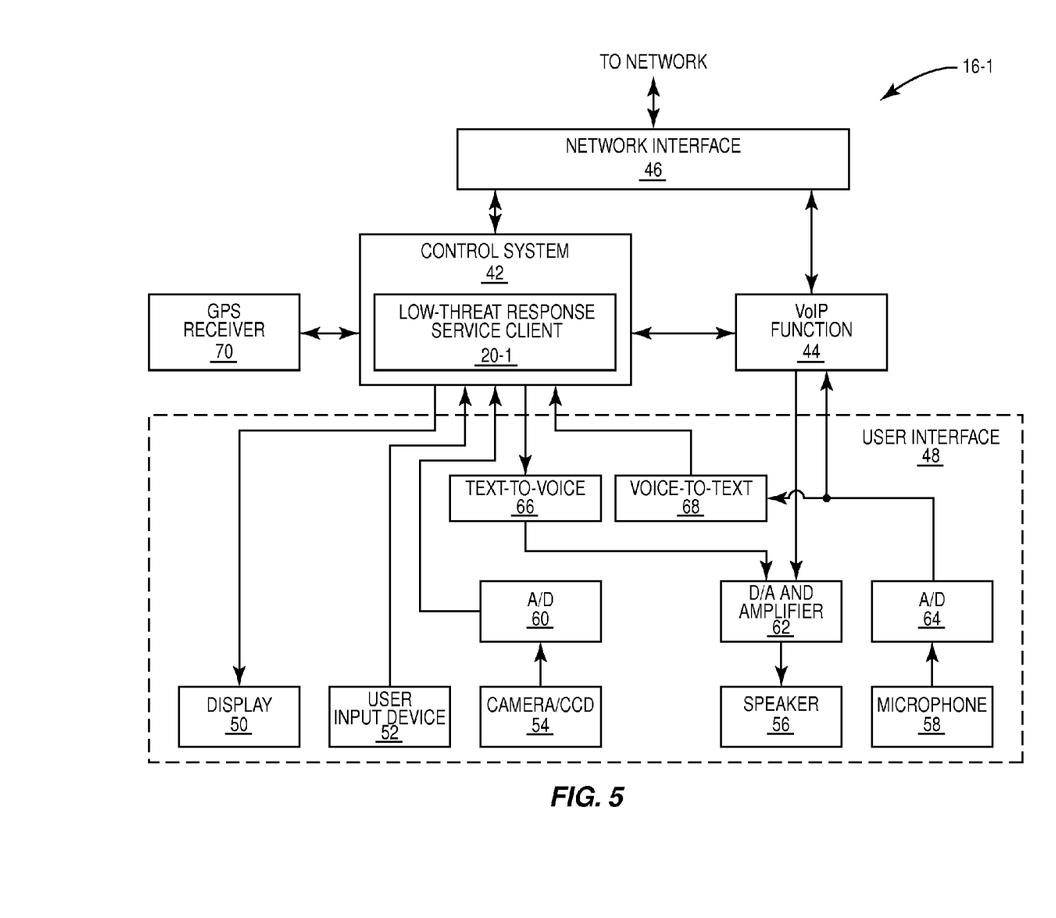
FIG. 5 is a block diagram of a mobile device according to one embodiment of the present invention.

FIG. 5 is a block diagram of the mobile device 16-1 of FIG. 1 according to one embodiment of the present invention. This discussion is equally applicable to the other mobile devices 16-2 and 16-3. The mobile device 16-1 generally includes a control system 42, a Voice-over-Internet Protocol (VoIP) function 44, a network interface 46, and a user interface 48 connected as shown. The control system 42 includes the low-threat response service client 20-1, which may be implemented in software, hardware, or a combination thereof. The VoIP function 44 may be implemented in hardware or a combination of hardware and software. Note that VoIP is exemplary and not intended to limit the scope of the present invention. Other types of voice communication technologies may be used. Both the control system 42 and the VoIP function 44 are connected to the mobile-to-mobile communications network 18 (FIG. 1) via the network interface 46.

The user interface 48 may include various components such as, for example, a display 50, a user input device 52 such as a keypad or touch screen, a camera or Charge Coupled Device (CCD) 54, a speaker 56, and a microphone 58. The display 50 generally receives and displays content provided by the control system 42. The user input device 52 provides input from the subscriber 14-1 to the control system 42. In this example, the camera or CCD device 54 captures images or video in an analog format. The analog output of the camera or CCD 54 is converted to a digital format by an analog-to-digital (A/D) converter 60 and provided to the control system 42.

The speaker 56 produces sound as a function of an analog signal provided by a digital-to-analog (D/A) converter and amplifier 62. The input to the D/A converter and amplifier 62 is generally voice communication data received from the VoIP function 44. However, the input to the D/A converter and amplifier 62 may alternatively be an automated voice signal synthesized by a text-to-voice converter 66. The text-to-voice converter 66 may be used to convert text-based information such as, for example, text-based instructions or commands from the control system 42 into synthesized or automated voice-based information output to the subscriber 14-1 via the speaker 56.

The microphone 58 outputs an analog signal as a result of, for example, the subscriber 14-1 speaking into the microphone 58. The analog signal output by the microphone 58 is converted to a digital signal by an A/D converter 64 and provided to the VoIP function 44 as part of a voice communication session or to the control system 42 via a voice-to-text converter 68. The voice-to-text converter 68 may enable voice-based commands such as, for example, issuing a low-threat response service request by speaking a corresponding command.

In this embodiment, the mobile device 16-1 also includes a GPS receiver 70 for obtaining the location of the mobile device 16-1. Alternatively, the GPS receiver 70 may be external to the mobile device 16-1 and accessed via a communication interface such as, for example, a Bluetooth interface. Still further, as discussed above, the mobile device 16-1 or the low-threat response service 12 may obtain the location of the mobile device 16-1 from another source and is not limited to the use of the GPS receiver 70.

Figure 6:
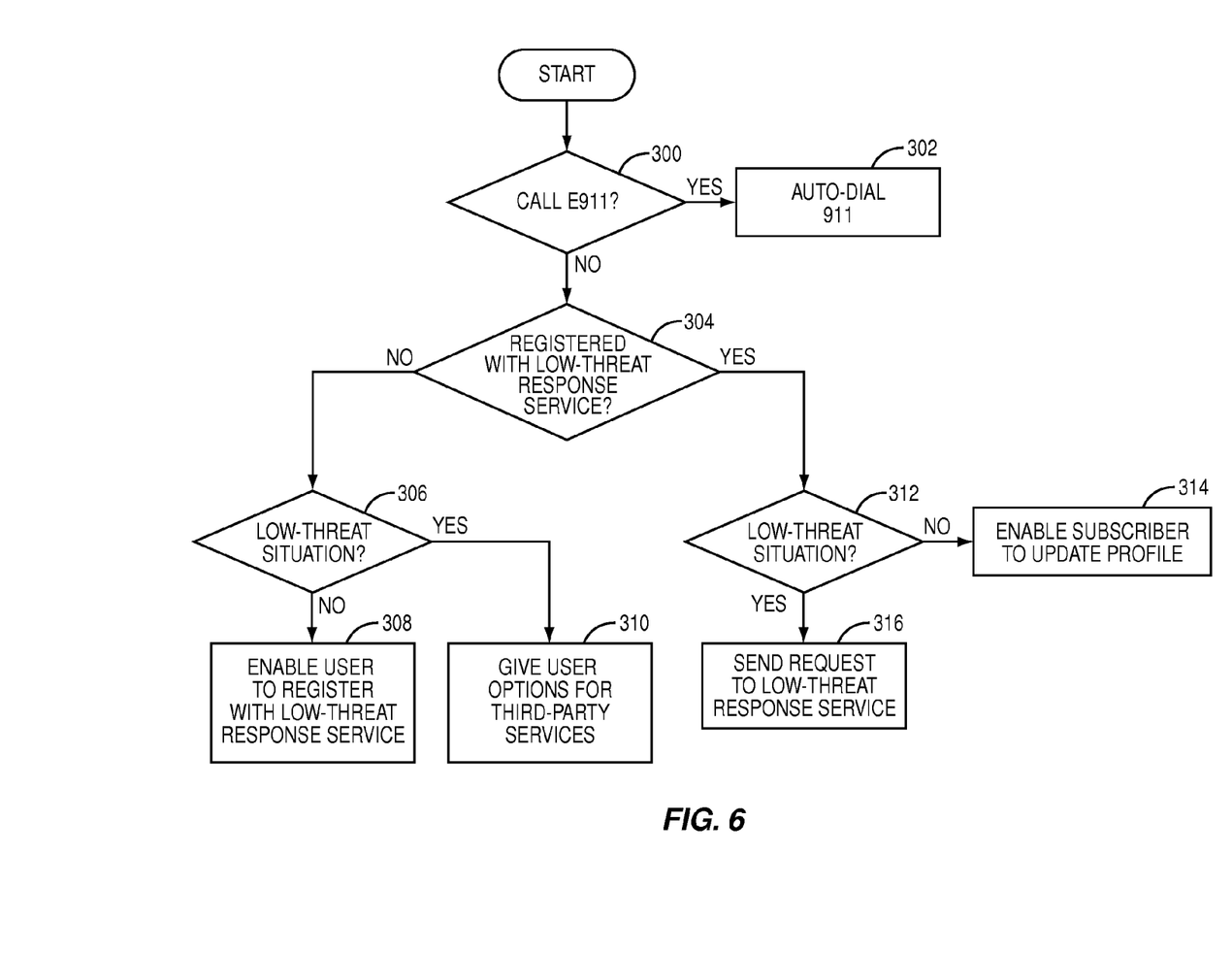
FIG. 6 is a flow chart illustrating the operation of one of the low-threat response service clients of FIGS. 1 and 5 according to one embodiment of the present invention.

FIG. 6 is a flow chart illustrating the operation of the low-threat response service client 20-1 of FIGS. 1 and 5 according to one embodiment of the present invention. First, upon being activated, the low-threat response service client 20-1 determines whether to contact E911 (step 300). This may be done by prompting the user/subscriber 14-1. Note that the term "user" is used to refer to the user/subscriber 14-1 of the mobile device 16-1 if he or she is not registered with the low-threat response service 12. If E911 is to be contacted, the low-threat response service client 20-1 auto-dials 911 (step 302). If not, the low-threat response service client 20-1 determines whether the user 14-1 is registered for, or a subscriber to, the low-threat response service 12 (step 304). This may be done by, for example, querying the low-threat response service 12 with an ID of the user 14-1.

If the user 14-1 is not registered with the low-threat response service 12, the low-threat response service client 20-1 determines whether there is a low-threat situation or event by, for example, querying the user 14-1 (step 306). If not, the low-threat response service client 20-1 enables the user 14-1 to register with the low-threat response service 12 (step 308). If there is a low-threat situation, the low-threat response service client 20-1 gives the user 14-1 options for third-party services (step 310). For example, the low-threat response service client 20-1 may give the user 14-1 the option of contacting a towing service, a security service, the police, or the like. If the user 14-1 chooses to contact a third-party service, the low-threat response service client 20-1 may auto-dial the selected third-party service.

Returning to step 304, if the user/subscriber 14-1 is registered with the low-threat response service 12, the low-threat response service client 20-1 determines whether there is a low-threat response situation or event (step 312). In order to determine whether there is a low-threat response situation or event, the low-threat response service client 20-1 may prompt the subscriber 14-1 to select a type of low-threat response situation or event that is occurring or select an option indicating that there is no low-threat situation or event. For example, the low-threat response service client 20-1 may present a menu to the subscriber 14-1, where the menu may include a list of known low-threat event types and a means for indicating that there is currently no low-threat event occurring.

If there is no low-threat situation or event occurring, the low-threat response service client 20-1 enables the subscriber 14-1 to update his or her subscriber profile (step 314). However, if there is a low-threat situation or event occurring, the low-threat response service client 20-1 generates and sends a request to the low-threat response service 12 (step 316). The request may include information such as the ID of the subscriber 14-1, the device ID of the mobile device 16-1 of the subscriber 14-1, a current location of the mobile device 16-1, and the low-threat event type. From this point, the low-threat response service client 20-1 operates in response to the low-threat response service 12. For example, the low-threat response service client 20-1 may receive a request from the low-threat response service 12 to confirm that the subscriber 14-1 is willing to accept assistance from a friend or a friend-of-a-friend. In response, the low-threat response service client 20-1 may prompt the subscriber 14-1 and return the response of the subscriber 14-1 to the low-threat response service 12. As another example, the low-threat response service client 20-1 may be instructed or otherwise controlled by the low-threat response service 12 to display a map directing the subscriber 14-1 to a responder.

The low-threat response service client 20-1 may include a timer that requires the subscriber 14-1 to respond at predetermined time intervals after making the request by, for example, entering a password. If the subscriber 14-1 does not respond, the low-threat response service client 20-1 may notify the low-threat response service 12, which may then contact an emergency service such as E911. Note that rather than entering the password, the subscriber 14-1 may enter an emergency code that appears to be a password but instead notifies the low-threat response service client 20-1, and thus the low-threat response service 12, that there is an emergency.

The present invention offers substantial opportunity for variation without departing from the spirit or scope of the present invention. As a first example, while the low-threat response service 12 has been described herein as being a centralized service, the present invention is not limited thereto. The low-threat response service 12 may alternatively be hosted by one or more or of the mobile devices 16-1 through 16-3 or distributed among the mobile devices 16-1 through 16-3 in a peer-to-peer (P2P) architecture. As a second example, while the discussion herein focuses on utilizing friends and friends-of-friends for responding to a low-threat response service request of a user, the present invention is applicable to any other technique for identifying persons not being affiliated with an emergency service that are within the proximate area of the requesting user. A responder may then be selected from the identified persons in a manner similar to that described above.

As a third example, in the discussion above, the low-threat response service 12 first determines whether there is a friend of the requesting subscriber 14-1 in the proximate area 22 that is available to respond. If not, the low-threat response service 12 then determines whether there is a friend-of-a-friend of the requesting subscriber 14-1 within the proximate area 22 that is available to respond. However, the present invention is not limited thereto. More specifically, the low-threat response service 12 may first identify all friends and friends-of-friends of the requesting subscriber 14-1 within the proximate area 22 of the requesting subscriber 14-1. A responder may then be selected from the friends and friends-of-friends of the requesting subscriber 14-1 within the proximate area 22 as a function of the assistance capabilities of the friends and friends-of-friends as compared to the low-threat event type, priorities assigned to the friends and friends-of-friends, distances from the friend and friends-of-friends to the requesting subscriber 14-1, response times from the friends and friends-of-friends to the requesting subscriber 14-1, or the like, or any combination thereof.

As a fourth example, if a friend or friend-of-a-friend is not available to respond to the request of a requesting subscriber 14-1 or if the requestor is not a registered subscriber, the low-threat response service 12 may direct the requester to a nearest safe place or notify the nearest police officer, security personnel, or the like. Further, even if a friend or friend-of-a-friend is available to respond, the low-threat response service 12 may direct the requesting subscriber 14-1 to a nearest safe place rather than to the location of the responding subscriber or notify the nearest police officer, security personnel, or the like. As a fifth example, public servants such as police officers may be added as friends of all of the subscribers 14-1 through 14-3. As such, if a police officer is within the proximate area 22 of the requesting subscriber 14-1, the police officer may be notified of the low-threat event and given the option to respond to the request in a manner similar to any other friend or friend-of-a-friend. As a final example, audio and/or video captured by the mobile device of the requesting and responding subscribers may be analyzed by the low-threat response service 12 or some other service. The audio and/or video may be analyzed programmatically or by a human to detect an emergency situation. If an emergency situation is detected, an emergency service such as E911 may be contacted.

Those skilled in the art will recognize improvements and modifications to the preferred embodiments of the present invention. All such improvements and modifications are considered within the scope of the concepts disclosed herein and the claims that follow.

What is claimed is:

1. A method of operation of a computing device comprising:
   receiving, from a first mobile device, a low-threat response service request initiated by a first user associated with the first mobile device; and
   identifying a responder for responding to the low-threat response service request initiated by the first user, the responder selected from a group consisting of: a friend of the first user located within a proximate area of the first user and a friend-of-a-friend of the first user located within the proximate area of the first user; and
   wherein identifying the responder comprises:
   determining whether a friend of the first user is within the proximate area of the first user;
   if a friend of the first user is within the proximate area of the first user, identifying the friend as the responder for responding to the low-threat response service request initiated by the first user; and
   if a friend of the first user is not within the proximate area of the first user, determining whether a friend-of-a-friend of the first user is within the proximate area of the first user; and
   if a friend-of-a-friend of the first user is within the proximate area of the first user, identifying the friend-of-a-friend as the responder for responding to the low-threat response service request initiated by the first user and confirming that the friend-of-a-friend is willing to provide assistance prior to identifying the friend-of-a-friend as the responder;
   effecting presentation of information at a second mobile device associated with the responder directing the responder to a location of the first user by effecting presentation of a map at the second mobile device associated with the responder, the map including directions to the location of the first user; and
   effecting presentation of information at the first mobile device associated with the first user directing the first user to a nearest safe location.

2. The method of claim 1 wherein identifying the responder comprises:
   identifying a plurality of friends of the first user within the proximate area of the first user; and
   selecting one of the plurality of friends as the responder as a function of assistance capabilities of the plurality of friends and a low-threat event type of the low-threat response service request.

3. The method of claim 2 wherein selecting the one of the plurality of friends as the responder is further a function of at least one criterion selected from a group consisting of: a priority assigned to each of the plurality of friends, a distance from the first user to each of the plurality of friends, and a response time from each of the plurality of friends to the first user.

4. The method of claim 1 wherein identifying the responder comprises:
   identifying a plurality of friends-of-friends of the first user within the proximate area of the first user; and
   selecting one of the plurality of friends-of-friends as the responder as a function of assistance capabilities of the plurality of friends-of-friends and a low-threat event type of the low-threat response service request.

5. The method of claim 4 wherein selecting the one of the plurality of friends-of-friends as the responder is further a function of at least one criterion selected from a group consisting of: a priority assigned to each of the plurality of friends-of-friends, a distance from the first user to each of the plurality of friends-of-friends, and a response time from each of the plurality of friends-of-friends to the first user.

6. The method of claim 1 wherein identifying the responder comprises:
   identifying a plurality of friends and friends-of-friends of the first user within the proximate area of the first user; and
   selecting one of the plurality of friends and friends-of-friends as the responder as a function of assistance capabilities of the plurality of friends and friends-of-friends and a low-threat event type of the low-threat response service request.

7. The method of claim 6 wherein selecting the one of the plurality of friends and friends-of-friends as the responder is further a function of at least one criteria selected from a group consisting of: a priority assigned to each of the plurality of friends and friends-of-friends, a distance from the first user to each of the plurality of friends and friends-of-friends, and a response time from each of the plurality of friends and friends-of-friends to the first user.

8. The method of claim 1 further comprising, if a friend of the first user is within the proximate area of the first user, confirming that the friend is willing to provide assistance prior to identifying the friend as the responder.

9. The method of claim 1 further comprising, if a friend of the first user is within the proximate area of the first user, confirming that the first user is willing to accept assistance from the friend prior to identifying the friend as the responder.

10. The method of claim 1 further comprising, if a friend-of-a-friend of the first user is within the proximate area of the first user, confirming that the first user is willing to accept assistance from the friend-of-a-friend prior to identifying the friend-of-a-friend as the responder.

11. The method of claim 1 further comprising providing the first user with a third-party service option if there is no friend or friend-of-a-friend of the first user within the proximate area of the first user.

12. The method of claim 11 wherein providing the first user with the third-party option comprises enabling the first user to contact a preferred third-party service previously defined by the first user for a low-threat event type of the low-threat response service request.

13. The method of claim 11 wherein providing the first user with the third-party option comprises enabling the first user to contact a system-defined third-party service for a low-threat event type of the low-threat response service request.

14. The method of claim 1 further comprising establishing communication between the first user and the responder via the first mobile device associated with the first user and a second mobile device associated with the responder.

15. The method of claim 1 further comprising effecting presentation of information at the first mobile device associated with the first user directing the first user to a location of the responder.

16. The method of claim 15 wherein effecting presentation of information at the first mobile device comprises effecting presentation of a map at the first mobile device associated with the first user, the map including directions to the location of the responder.

17. The method of claim 1 wherein there are two or more degrees of separation between the friend-of-a-friend of the first user and the first user.

18. The method of claim 1 further comprising providing notification to the first user at the first mobile device that the responder is coming to provide assistance.

19. A system comprising:
a network interface enabling the system to connect to a mobile-to-mobile communications network; and
a low-threat response service control system associated with the network interface and adapted to:
receive, from a first mobile device, a low-threat response service request initiated by a first user associated with the first mobile device; and
identify a responder for responding to the low-threat response service request initiated by the first user, the responder selected from a group consisting of: a friend of the first user located within a proximate area of the first user and a friend-of-a-friend of the first user located within the proximate area of the first user; and
wherein to identify the responder comprises:
determining whether a friend of the first user is within the proximate area of the first user;
if a friend of the first user is within the proximate area of the first user, identifying the friend as the responder for responding to the low-threat response service request initiated by the first user;
if a friend of the first user is not within the proximate area of the first user, determining whether a friend-of-a-friend of the first user is within the proximate area of the first user; and
if a friend-of-a-friend of the first user is within the proximate area of the first user, identifying the friend-of-a-friend as the responder for responding to the low-threat response service request initiated by the first user and confirming that the friend-of-a-friend is willing to provide assistance prior to identifying the friend-of-a-friend as the responder;
effecting presentation of information at a second mobile device associated with the responder directing the responder to a location of the first user by effecting presentation of a map at the second mobile device associated with the responder, the map including directions to the location of the first user; and
effecting presentation of information at the first mobile device associated with the first user directing the first user to a nearest safe location.

* * * * *